United States Patent
Spence et al.

(10) Patent No.: US 6,750,289 B2
(45) Date of Patent: Jun. 15, 2004

(54) FUNCTIONALIZED THERMOPLASTIC ELASTOMER

(75) Inventors: Bridget Ann Spence, Houston, TX (US); Ronald James Hoxmeier, Houston, TX (US); Robert Charles Job, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/349,839

(22) Filed: Jan. 23, 2003

(65) Prior Publication Data

US 2003/0158334 A1 Aug. 21, 2003

Related U.S. Application Data

(62) Division of application No. 09/872,625, filed on Jun. 1, 2001, now Pat. No. 6,552,125, which is a division of application No. 09/502,646, filed on Feb. 11, 2000, now Pat. No. 6,319,990, which is a division of application No. 09/080,822, filed on May 18, 1998, now Pat. No. 6,100,337.

(51) Int. Cl.$^7$ .................. C08F 255/02; C08F 255/08
(52) U.S. Cl. .................. 525/106; 525/271; 525/301; 525/302; 525/319; 525/324
(58) Field of Search ................. 525/106, 271, 525/301, 319, 324, 302

(56) References Cited

U.S. PATENT DOCUMENTS 6,197,891 B1 * 3/2001 Schwindeman et al. . 525/332.9

* cited by examiner

*Primary Examiner*—Jeffrey Mullis
(74) *Attorney, Agent, or Firm*—Beverlee G. Steinberg

(57) ABSTRACT

A thermoplastic elastomer produced without a hydrogenation step is functionalized utilizing a free radical initiator and a functionalizing monomer having at least one point of unsaturation. The base polymers can be produced by copolymerizing an α-olefin capable of producing an amorphous backbone with a comonomer which provides a "hook" for grafting to with a living polystyrene chain. Another method is to copolymerize an α-olefin monomer system capable of producing an amorphous backbone with a comonomer containing a functional group from which an anionically polymerizable monomer is grown from the backbone. A third method involves copolymerizing an α-olefin monomer system capable of giving an amorphous backbone with an olefin-terminated polystyrene comonomer. In a less preferred embodiment, a conventional EPDM polymer can be metallated and a monoalkenyl aromatic compound anionically polymerizable monomer grown from the backbone.

9 Claims, No Drawings

FUNCTIONALIZED THERMOPLASTIC ELASTOMER

This is a continuation division continuation-in-part of application Ser. No. 09/872,625 filed Jun. 1, 2001, now U.S. Pat. No. 6,552,125 which is a division of Ser. No. 09/502,646 filed Feb. 11, 2000, now U.S. Pat. No. 6,319,990, which is a division of Ser. No. 09/080,822 filed May 18, 1998, now U.S. Pat. No. 6,100,337, the entire disclosure of which is hereby incorporated by reference.

BACKGROUND OF THE INVENTION

This invention relates to functionalized polymers.

Synthetic polymers are generally characterized as either resinous or elastomeric. Historically, elastomeric polymers required chemical vulcanization before they possessed sufficient strength for utilities such as tire treads, shoe soles, rubber bands, and other elastic utilities requiring some level of strength. However, these compositions after vulcanization were no longer thermoplastic.

In the 1960s a major advance in the art occurred with the discovery and commercialization of thermoplastic elastomers. These materials possess an internal elastomeric block and a plurality of terminal aromatic blocks. On cooling from a melt, such compositions exhibit high tensile strength, high elongation, and rapid and almost complete recovery after elongation. This is attributed to the fact that in the bulk state, the aromatic end segments of these block copolymers agglomerate. At temperatures significantly below the glass transition temperature ($T_g$) of the aromatic end blocks, these agglomerations (domains) act as strong, multifunctional junction points and so the copolymers behave as though they are joined in a cross-linked network.

Such polymers are non-polar and hence are sometimes not ideally suited for applications that require adhesion to polar substrates or that require compatibility with polar polymeric materials. This can be overcome by incorporating a functional group on the polymer. However, these polymers contain a large amount of aliphatic unsaturation in the diene blocks which can result in cross-linking and gellation of polymer chains during the free-radical grafting reactions used to incorporate polar functional groups. Hence, it is necessary to utilize a hydrogenation step prior to incorporating a functional group. Hydrogenation can be accomplished using any of several hydrogenation processes known in the art. For instance, the commonly used method is to employ a Group VIII metal catalyst, particularly nickel or cobalt, with a suitable reducing agent such as an aluminum alkyl to catalyze the hydrogenation. The disadvantage in this is the necessity for the additional hydrogenation and catalyst removal steps. These steps are equipment and time intensive and thereby increase the complexity and cost of producing functionalized thermoplastic-plastic elastomers. In addition, the hydrogenation catalysts are sensitive to certain poisons, making hydrogenation of polymers containing particular functional groups or coupling agent residues difficult or impossible.

Thus, it would be highly desirable to have a process by which functionalized thermoplastic elastomers could be directly produced without the necessity of a hydrogenation step.

SUMMARY OF THE INVENTION

It is an object of this invention to provide functionalized thermo-plastic elastomers without the utilization of a hydrogenation step.

In accordance with this invention a thermoplastic elastomer is prepared with an amorphous olefin or EPDM backbone and a plurality of pendant aromatic side chains and thereafter contacted with a reactive functional monomer in the presence of a free radical initiator.

DESCRIPTION OF THE PREFERRED EMBODIMENTS

Surprisingly, it has been found that even though α-olefin amorphous backbones inherently contain a regular pattern of alkyl side chains which are a potential source of Beta-scission, thermoplastic elastomers having such backbones can be functionalized and still retain a significant amount of strength.

Amorphous Backbone

There are two embodiments to this invention. In the first and preferred embodiment there is an all α-olefin amorphous backbone. In this embodiment the backbone is made of an olefin monomer or a mixture of olefin monomers and a comonomer. The monomer is either a $C_4$ to $C_{30}$ α-olefin (or mixtures thereof) or ethylene and a higher α-olefin second monomer (higher than ethylene, i.e. $C_3$ and higher). As a practical matter, the second monomer will almost always be a $C_3$ to $C_5$ α-olefin since there would be little point in utilizing a $C_6$ or higher second monomer since an amorphous backbone can be made directly from a $C_6$ α-olefin, if desired. Broadly, however, the second monomer can be any $C_3$ to $C_{30}$ α-olefin. The preferred monomers are hexene, octene, ethylene/propylene and ethylene/butene. When the backbone is made from a combination of ethylene and a $C_3$ or higher α-olefin, the $C_3$ or higher α-olefin is used in a mole ratio of 20 to 40, preferably 30 to 40, more preferably 30 to 35 percent.

There are three aspects to this first embodiment of the invention. In the first aspect, the comonomer is a 1-alkenyl compound containing a functional group to which an anionic polymer can be grafted "to" to produce a pendant graft block side chain.

Suitable comonomers are those having the formula

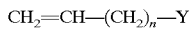

where $n \geq 0$ and Y is selected from the group including halosilane groups, hydridosilane groups, ester groups, aldehyde groups, ketones, halogens, epoxides, and phosphorous groups of the formula P-$Z_2$ where Z is Cl, Br, I, F, hydrogen, ester groups, or combinations of these.

The preferred 1-alkenylhalosilane compounds which can be used in the present invention include $H_2C$=CH—$(CH_2)_n$—$SiX_3$ where $n \geq 0$; X=halogen, R or H or combinations thereof, R is alkyl, or aryl; and at least one X must be halogen. This definition of R is in the context of a 1-alkenylhalosilane, R being used in other contexts hereinafter. Similarly X is used in another context later. $H_2C$=CH—$(CH_2)_n$—$SiMe_2Cl$ is preferred because when the presence of ungrafted anionic polymer in the final product is undesirable, this halosilane may easily be removed from the backbone copolymer due to its high volatility.

Also preferred for the same reason are hydrosilane compounds of the formula

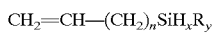

where $n \geq 0$, $x+y=3$, $x \geq 1$, and $y \leq 2$. Most preferred compounds have these structures: $CH_2$=CH—$CH_2$—$SiH_3$, $CH_2$=CH—$SiH_3$, $CH_2$=CH—$SiH_2CH_3$, and $CH_2$=CH—$CH_2$—$SiH_2CH_3$. In the last two structures halogen may take the place of H, in which case the silanes would be halosilanes.

In the second aspect of this first embodiment, the comonomer is a vinyl aromatic compound represented by the general formula

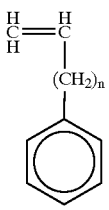
(1)

wherein n is an integer of 0 to 20, or an alkenyl alkyl or aryl silane represented by the formula:

$$CH_2=CH-(CH_2)_n-SiR_mH_x \qquad (2)$$

where n is 0 or an integer of from 1 to 12; R is alkyl or aryl, preferably methyl, phenyl, or ethyl; x is 0 or 1; m is 2 or 3; and x+m 3. The most preferred alkenyl silanes for use herein are allyltrimethylsilane and allyl dimethylsilane because they are most reactive to copolymerization with α-olefins. This forms a copolymer which becomes the backbone of the graft block copolymer of the present invention.

In this aspect of the first embodiment, the comonomer contains a functional group. In the case of the first formula, the benzylic carbon atom imparted by the comonomer can be deprotonated by a metallating agent such as RLi and the resulting structure behaves in a manner similar to styrene anions. Thus, while the vinyl aromatic comonomer might not normally be thought of as imparting a functional group on incorporation into the polymer chain, the benzylic hydrogen is functional to the metallating agent. In the case of the second formula, the R group can be deprotonated by the metallating agent. From this metallated functional group a monovinyl arene anionically polymerizable monomer is grown "from" the backbone to form pendant aromatic side chains.

In the third aspect of this first embodiment of the invention, the comonomer is an olefin capped aromatic polymer chain utilized to give aromatic side chains of sufficient length and number to form resinous or glassy domains. The comonomer is produced by anionic polymerization of a monoalkenyl aromatic compound having 8 to 20 carbon atoms with alkenyl groups of up to 3 carbon atoms attached to a benzene ring as exemplified by styrene and styrene homologs such as ethylvinylbenzene, α-methylstyrene and paramethylstyrene. Styrene and α-methylstyrene are particularly preferred monoalkenyl aromatic compounds, especially styrene.

The initiator systems used in the first step of producing these macromonomers are those conventionally used in the art. They generally are of the general formula RLi where R is a hydrocarbyl radical of 1 to about 20 carbon atoms. This is the definition of R in the context of RLi, R being used later in a different context. Examples of such lithium initiators are methyllithium, isopropyllithium, n-butyllithium, sec-butyllithium, t-butyllithium, n-dodecyllithium, cyclohexyllithium, and 4-cyclohexyllithium. Preferred are n-butyllithium and sec-butyllithium. The amount of the lithium metal initiator employed depends upon the desired molecular weight of the macromonomer. Normally, the organomonollithium initiator is employed in the range of about 0.1 to 200, preferably 2 to 30 millimoles per 100 grams of total monoalkenyl aromatic monomer.

The polymerization reaction to produce the comonomer (macromer) precursor can be carried out in the presence of a hydrocarbon diluent. Preferably the hydrocarbon diluent is a paraffinic, cyclo-paraffinic or aromatic hydrocarbon having 4–10 carbon atoms or a mixture of such diluents. Examples for the diluent are n-hexane, n-heptane, 2,2,4-trimethylpentane, cyclohexane, benzene and toluene. Cyclohexane is generally the preferred paraffinic solvent.

It is preferred, however, to carry out the initiation of the aromatic macromonomer precursor in the presence of an α-olefin diluent and thereafter to end cap the resulting alkali metal terminated living polymer chain in the presence of the same diluent.

The reaction is generally carried out with a weight ratio of diluent to monomers exceeding 1. Preferably the diluent is employed in a quantity between about 2 to about 20 parts by weight, most perfably 3 to 10 parts by weight, per 1 part by weight of total anionically polymerizable monomers. The term "anionically polymerizable monomer" refers to the monomer utilized to prepare the comonomer precursor.

The polymerization to produce the macromer precursor usually occurs within a period of time ranging from 1 minute up to about 6 hours. Preferably, the reaction is carried out within a time period of about 10 minutes to about 2 hours. The polymerization temperature is not critical and will generally be in a range of from about 15° to about 150° C., preferably in a range of about 40° to about 90° C. If the polymerization is carried out at a temperature above the boiling point of the reaction mixture, then reflux and/or elevated pressure can be used to maintain liquid conditions in the reaction medium.

Various materials are known to be detrimental to the lithium metal-initiated polymerization. Particularly, the presence of carbon dioxide, oxygen, water and alcohols should be avoided during the organollithium-initiated polymerization reaction to produce the alkali metal terminated macromer precursor.

It is also within the scope of this invention to use an unsaturated initiator such as vinyl lithium or allyl lithium. After the polymerization the lithium end can simply be terminated in a conventional manner, i.e. with an alcohol, and the vinyl at the other end provides the polymerizable entity; or the lithium can be reacted with an olefinic halosilane to give an α,ω-olefin if some crosslinking were desired.

Subsequent to the above-described initiation of the macromer precursor, the resulting living aromatic polymer chain is capped to give a terminal α-olefin. This is done with an alkenyl halosilane having only one halogen atom as represented by the following general formula

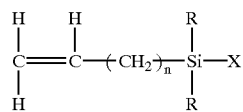

wherein n is an integer of from 0 to 16, preferably 0 to 6, R is an alkyl generally having 1 to 10 carbon atoms and preferably methyl and X is a halogen, preferably chlorine. Thereafter, the resulting α-olefin-terminated aromatic macromonomeric comonomer (macromer) is reacted with the α-olefin monomer (or monomers) described previously.

One embodiment of this invention is exemplified as follows

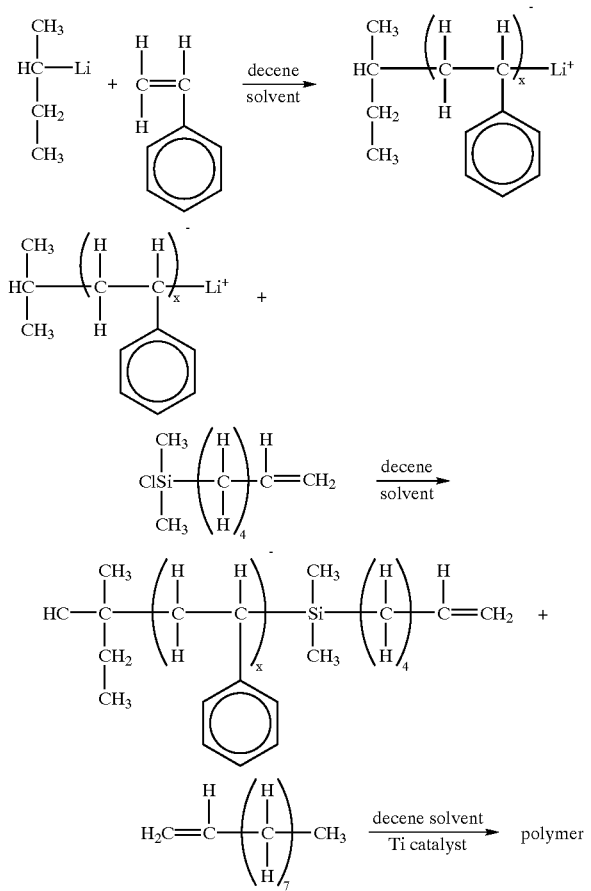

In this preferred embodiment, the alkyl alkali metal initiator is reacted with the monoalkenyl aromatic compound to give the living aromatic polymer chain in the olefin solvent. This is the comonomer precursor. Thereafter, this living aromatic polymer chain is reacted with the alkenyl halosilane to give the macromer comonomer, also in the presence of olefin solvent. Finally, the comonomer is copolymerized with α-olefin monomer in a solventless system (the only diluent being α-olefin monomer). Most preferably, the diluent all through this operation is the same α-olefin as that used as the monomer in the final copolymerization reaction. However, any α-olefin monomer capable of being liquid under the pressure and temperature conditions being employed can be used as the diluent. Preferred are $C_4-C_{12}$ α-olefins, most preferably hexene, octene and decene.

Broadly then, the comonomer is represented by the general formula

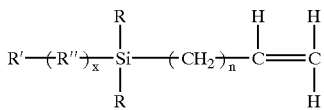

where R' is the remnant of the organollithium initiator, R" is a polymerized arene unit, R is alkyl as noted above, x is an integer sufficient that the comonomer exhibits a molecular weight within the range of 500–30,000, preferably 1000–21,000, most preferably 5000–20,000 and n is an integer of from 0 to 16, preferably 0 to 6. Thus, on copolymerization the side chains are represented by the general formula

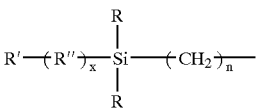

The comonomer is employed in an amount sufficient to give incorporation of about 5 to 49 weight percent comonomer based on the total weight of incorporated monomer and comonomer. Preferably, the incorporated weight of comonomer is within the range of 10 to 40, more preferably 15 to 35 weight percent based on the total weight of the copolymer. The weight percent glassy regions of the final polymer will closely approximate the weight percent comonomer since the backbone is essentially amorphous and the polymerized comonomer chains pre-dominantly form glassy domains.

While the individual aromatic side chains are generally lower molecular weight than the end blocks of prior art thermoplastic elastomers, they still form glassy domains to "crosslink" the polymer to give strength while the amorphous backbone imparts elastomeric characteristics.

Thus, in this aspect of the first embodiment the thermoplastic elastomer to be functionalized is already complete whereas in the first two aspects of the first embodiment, the side chains remain to be provided.

Methods for carrying out the copolymerization of the α-olefin backbone monomer and the comonomer for all three aspects of the first embodiment of this invention include the use of metallocene or Ziegler-Natta catalysis as well as cationic polymerization. Other methods include free radical or Lewis acid catalyzed processes.

Metallocene catalysts are organometallic coordination compounds obtained as a cyclopentadienyl derivative of a transition metal or metal halide. Their use in the polymerization of olefins is well known.

A useful Ziegler-Natta catalysis process is described in Asanuma, U.S. Pat. No. 5,045,597 (Sep. 3, 1991) which is herein incorporated by reference. The Ziegler-Natta method of polymerization requires the presence of a catalyst which includes a transition metal compound and which also utilizes an aluminum compound as well as an electron donor. Such transition metal compounds include titanium halides such as titanium tetrachloride, magnesium alkoxide supported titanium tetrachloride and certain metallocenes of zirconium, titanium, and hafnium which are known from the art to polymerize α-olefins. The aluminum compound is usually an organo aluminum compound which is preferably selected from the group consisting of trialkyl aluminum, dialkylaluminum halides, alkyl aluminum sesquihalides, alkyl aluminum dihalides and aluminoxanes. There are a wide variety of electron donors which can be used and they are usually oxygen or nitrogen containing compounds such as ethers, esters, ortho ethers, alkoxy-silicon compounds, and heterocyclic aromatic nitrogen compounds.

The Ziegler-Natta polymerization may be conducted in neat monomer, by solvent polymerization, or by vapor phase polymerization. Generally, the polymerization is conducted at a temperature of from 30° C. to 100° C. under a pressure of from atmospheric to the vapor pressure of the 1-alkenyl functionalized monomer at the polymerization temperature and optionally in the presence of a molecular weight control agent such as hydrogen.

Thermoplastic elastomers require an amorphous polymer backbone and glassy or semicrystalline polymer grafts. Other catalysts suitable for producing amorphous polymer backbones are described in Job, U.S. Pat. No. 5,122,494 (Jun. 16, 1992), Job, U.S. Pat. No. 5,089,573 (Feb. 18, 1992), Job et al, U.S. Pat. No. 5,118,768 (Jun. 2, 1992), Job, U.S. Pat. No. 4,874,737 (Oct. 17, 1989), Wilson et al, U.S.

Pat. No. 4,971,936 (Nov. 20, 1990), and Job et al, U.S. Pat. No. 5,229,477 (Jul. 20, 1993), which are all herein incorporated by reference.

A preferred catalyst for use herein is described in Job U.S. Pat. No. 5,122,494 (Jun. 19, 1992). The catalyst is formed by contacting, in the presence of an inert diluent, an alkyl aluminum halide halogenating agent with a complex magnesium-containing, titanium-containing alkoxide compound prepared by reaction of magnesium alkoxide, titanium tetra-alkoxide and a phenolic compound. The complex alkoxide compounds are of somewhat variable stoichiometry but have the general illustrative formula

$Mg_3Ti(OR''')_8X_2$ wherein R''' independently is alkyl of up to four carbon atoms inclusive and X independently is a monovalent anion derived from an electron donor such as a phenolic compound, aldehyde or ether as described herein. The diluent is then removed to produce, as a particulate solid, the complex alkoxide compound. This solid is treated with alkyl aluminum halide to produce the olefin polymerization catalyst.

The preferred alkoxides are magnesium ethoxide, $Mg(OEt)_2$, and titanium-tetraethoxide. The phenolic compound is selected from phenol or an activated phenol (a monohydroxylic phenol of one aromatic ring having aromatic ring substituents other than hydrogen which serve to alter the pKa of the phenolic compound). Suitable phenolic compounds are phenol, o-cresol, and 2,6-di-t-buty-4-methylphenol (BHT). An election donor as described hereinabove or hereinbelow can also be used.

The α-olefin backbone monomer and the comonomer may be cationically polymerized by reacting them in the presence of a cationic polymerization initiator in the presence of a Lewis acid and, generally, an electron donor. The Lewis acid and the electron donor may be complexed together. Lewis acids which can be utilized herein include metal halides, such as aluminum trichloride (and molten salts containing aluminum trichloride), boron trichloride, boron trifluoride and titanium tetrachloride, and organometallic derivatives, such as ethylaluminumdichloride and triethyl aluminum, and oxyhalides, such as phosphorus oxychloride. Electron donors which are useful herein include alkyl amines, pyridines, such as 2,6-lutidiene and 2,4,6-collidine, triaryl or trialkyl phosphines, benzaldehyde, ethers such as 1,2-dioxybenzene and veratrole. The cationic polymerization initiators are generally taken from the group consisting of tertiary alkyl halides such as t-butylchloride and triphenymethylfluoride.

The preferred Lewis acids are aluminum trichloride and boron trichloride because of their higher activity. The preferred electron donors are 2,6-lutidine and benzaldehyde because they have been shown to give random copolymers and highly amorphous polymers, respectively (Job et al, U.S. Pat. No. 5,134,209 (Jul. 28, 1992) and the Job U.S. Pat. No. 5,229,477 patent. The preferred cationic polymerization initiators are cumyl-type derivatives like cumylchloride, alkoxide, or aliphatic tertiary chlorides.

The cationic polymerization may be a batch, semicontinuous, or a continuous process. Generally, the polymerization is carried out at a temperature of from about –100 to about 0° C. under a pressure of from 0 to 10 atm. Another method for copolymerizing the α-olefins and the functionalized monomers is free radical polymeriazation.

In the second embodiment of the invention, the backbone is simply a conventional ethylene/propylene diene monomer (EPDM) polymer which is metallated in a manner known in the art so as to provide sites for the anionic polymerization of a monovinylarene anionically polymerizable monomer "from" the backbone. The production of the EPDM polymers and the lithiation thereof are known in the art as shown in Lund et al, U.S. Pat. No. 4,786,689 (Nov. 22, 1988); and Lund et al, U.S. Pat. No. 4,794,145 (Dec. 27, 1988), the disclosures of which are hereby incorporated by reference. These reactions generally involve the metallation of allylic sites in the olefinic moieties of the diene monomer by reaction with alkyllithium compounds in the presence of activators. These lithiated sites then serve as initiator sites to initiate the polymerization of subsequently added anionically polymerizable monomer.

Side Chain Formation—First Embodiment

In the first aspect of the first embodiment of this invention, a living aromatic polymer side chain is produced by anionic polymerization as described hereinabove with regard to the preparation of the olefin terminated polystyrene comonomer in the third aspect of the first embodiment of this invention. The only difference being that instead of terminating the living polymer with an alkenyl halosilane to give a macromer, the living polymer chain is left intact and reacted with the functional group supplied by the comonomer. This results in grafting the living aromatic polymer chain to the amorphous backbone at the site of the comonomer incorporation.

By living polymer chains it is meant that the polymerization initiator is still a part of the polymer chain and is active and available for further polymerization if more monomer becomes available. In this case, the polymerization is ended when the monomer supply is exhausted. For example, when polystyrene is polymerized and an organo lithium compound is used as the initiator, the living polymer chain can be represented as

$PS^-Li^+$

This is known as polystyryl lithium.

A particularly desireable feature of this embodiment of the present invention is the ability to produce a saturated graft block copolymer without the necessity for a hydrogenation step. By "saturation" is meant no or essentially no aliphatic unsaturation. Saturated graft block copolymers are produced in the first aspect of this embodiment since the anionically polymerized monomer is one which contains a single aliphatic double bond. Examples are vinyl aromatic hydrocarbons, particularly styrene, substituted styrenes, and ethylene. When these monomers are utilized the result is a saturated graft block copolymer.

The final step of the first aspect of this embodiment is accomplished as noted above by grafting the living polymer chains onto the copolymer. For halosilane comonomers, this takes place by replacement of a halogen attached to the silicon with the living polymer chain. This is accomplished by reacting the two polymers in the presence of an activator such as tetramethylethylenediamine or ethers such as glyme (1,2-dimethoxyethane), o-dimethoxybenzene, or ethylene glycol diethylether, at a temperature of 30 to 100° C. and a pressure of 1 to 10 atm. This step also can be carried out in the absence of activators but it proceeds more slowly to completion.

The copolymerization of the α-olefin and the 1-alkenyl functionalized comonomer produces a polymer with a saturated olefinic backbone having pendent saturated alkyl chains having a functional group attached thereto which may be a terminal group or which may be in the internal portion of the chain. Such copolymers may be represented by the following:

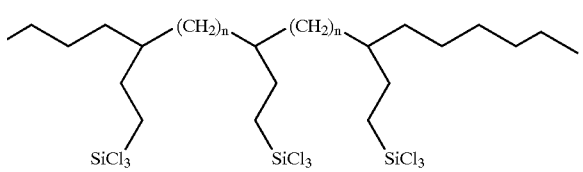

The living polymer chains react with these copolymers at the silicon trichloride sites and the polymer chain takes the place of a chloride on the silicon trichloride group in the polymer so that it becomes part of a pendent side chain. In the case of a polystyryl lithium living polymer, the above copolymer is converted to a saturated graft block copolymer with the following formula:

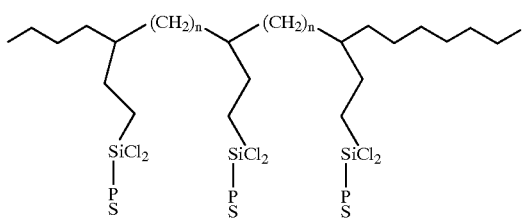

In the second aspect of the first embodiment of the invention, the backbone is metallated ("lithiated" when lithium is the metal) by reaction with a metal alkyl or aryl compound, especially alkyl lithium (RLi) compounds such as sec-butyl lithium or n-butyllithium in the presence of a polar metallation activator. The RLi compound lithiates (metallates) one of the carbons, generally by abstraction of the benzylic hydrogen. Thus, in the context of this invention the benzylic position constitutes a functional group as noted previously. This results in the following structure when n is 0:

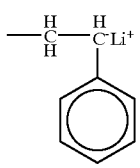

When n is 1 to 20 it results in the following structure:

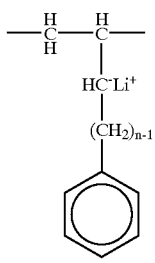

Some metallation of the benzene ring itself can also occur. In any event, the resulting

then serves as a subsequent initiation site for anionically polymerizable monomers to polymerize out "from" the backbone to produce pendant side chains.

An activator is generally required to catalyze the metallation reaction. Suitable activators include tertiary aliphatic amines, tertiary diamines, and triamines. Preferred activators include dipiperidinoethane and tetramethyl-ethylenediamine (TMEDA). The metallation reaction is generally carried out at 0 to 100° C., preferably 25 to 60° C. for a time within the range of 1 minute to 24 hours, preferably 30 minutes to 1 hour. Suitable solvents for the metallation include saturated non-aromatic solvents such as cyclohexane. Generally, the comonomer is employed in an amount just sufficient to give about the number of sites desired for pendant chains. Accordingly, the metallation promoter is generally present in an amount of about 1 equivalent per polymerized comonomer unit. However, this could be subject to wide variation. For instance, more sites could be incorporated into the backbone than necessary and hence less than a stoichiometric amount of metallation agent would be used. Alternatively, an excess may be used so as to speed up the metallation with excess thereafter being removed. More detail concerning the metallation can be found in Gergen and Lutz, U.S. Pat. No. 4,898,914 (Feb. 6, 1990), the disclosure of which is hereby incorporated by reference. All of the conditions broadly set out in the above-described patent are applicable herein.

Once the metallation reaction is complete, there will be a number of metallated sites on the copolymer which are available for growth of anionically polymerized polymer side chains.

The final step of the process of preparing the polymer to be functionalized in this second aspect of the first embodiment of this invention is accomplished, for example, by growing the living polymer chains from the lithiated α-olefin/vinyl aromatic copolymer by initiation and subsequent polymerization from the lithiated sites with the anionically polymerizable monomer. This is accomplished by reacting the backbone metallated copolymer and the anionically polymerizable monomer in a suitable solvent. Generally, reaction temperature ranges from about −150° C. to about 300° C., preferably 0° C. to 100° C. Reaction time generally ranges from about 5 minutes to about 24 hours, preferably 30 minutes to 3 hours. Reaction pressure is generally 1–10 atmospheres.

As noted hereinabove, the polymer to be functionalized is already complete in the third embodiment of the first aspect of this invention since the comonomer itself is a macromer which carries the pendant aromatic site chain.

Side Chain Formation—Second Embodiment

In the second embodiment of this invention, the EPDM backbone polymer is metallated as is known in the art and then a monoalkenyl aromatic monomer grafted "from" the metallated site as in the second aspect of the first embodiment of the invention. This embodiment of the invention is less preferred because from about 1 to 4% unsaturation remains in the rubber backbone due to diene comonomer and these sites are prone to degradation in the presence of heat and/or chemicals resulting in the loss of material properties.

Functionalization

The amorphous backbone polymers of this invention can be functionalized in the same manner as conventionally prepared thermoplastic elastomers. Such techniques are disclosed, for instance, in Gergen et al, U.S. Pat. No. 4,578,429 (Mar. 25, 1986), the disclosure of which is hereby incorporated by reference. Briefly, this can be described as follows.

In order to incorporate functionalities into the base polymer, monomers capable of reacting with the base polymer, for example, in solution or in the melt, by free radical mechanism are necessary. Monomers may be polymerizable or nonpolymerizable, however, preferred monomers are non-polymerizable or slovenly polymerizing.

The monomers must be ethylenically unsaturated in order to take part in free radical reactions. It has been found that by grafting unsaturated monomers which have a slow polymerization rate, the resulting graft copolymers contain little or no homopolymer of the unsaturated monomer and contain only short grafted monomer chains which do not separate into separate domains.

The class of preferred functionalizing monomers which will form polymers within the scope of the present invention have one or more functionalities or their derivatives such as carboxylic acid groups and their salts, anhydrides, esters, imide groups, amide groups, acid chlorides and the like in addition to at least one point of unsaturation.

These functionalities can be subsequently reacted with other modifying materials to produce new functional groups. For example a graft of an acid-containing monomer could be suitably modified by esterifying the resulting acid groups in the graft with appropriate reaction with hydroxy-containing compounds of varying carbon atom lengths. The reaction can take place simultaneously with the grafting or in a subsequent post modification reaction.

The functionalized polymer will usually contain from 0.02 to 20, preferably 0.1 to 10, and most preferably 0.2 to 5 weight percent of functionality.

The preferred functionalizing monomers are unsaturated mono- and polycarboxylic-containing acids ($C_3$–$C_{10}$) with preferably at least one olefinic unsaturation, and anhydrides, salts, esters, ethers, amides, nitriles, thiols, thioacids, glycidyl, cyano, hydroxy, glycol, and other substituted derivatives from said acids.

Examples of such acids, anhydrides and derivatives thereof include maleic acid, fumaric acid, itaconic acid, citraconic acid, acrylic acid, glycidyl acrylate, cyanoacrylates, hydroxy $C_1$–$C_{20}$ alkyl methacrylates, acrylic polyethers, acrylic anhydride, methacrylic acid, crotonic acid, isocrotonic acid, mesaconic acid, angelic acid, maleic anhydride, itaconic anhydride, citraconic anhydride, acrylonitrile, methacrylonitrile, sodium acrylate, calcium acrylate, and magnesium acrylate.

Other functionalizing monomers which can be used either by themselves or in combination with one or more of the carboxylic acids or derivatives thereof include $C_2$–$C_{50}$ vinyl monomers such as acrylamide, acrylonitrile and monovinyl aromatic compounds, i.e. styrene, chlorostyrenes, bromostyrenes, α-methylstyrene, and vinyl pyridines.

Other functionalizing monomers which can be used are $C_4$ to $C_{50}$ vinyl esters, vinyl ethers and allyl esters, such as vinyl butyrate, vinyl laurate, vinyl stearate, and vinyl adipate, and monomers having two or more vinyl groups, such as divinyl benzene, ethylene dimethacrylate, triallyl phosphite, dialkylcyanurate and triallyl cyanurate.

The preferred functionalizing monomers to be reacted with the block copolymers according to the present invention are maleic anhydride, maleic acid, fumaric acid and their derivatives. It is well known in the art that these monomers do not polymerize easily.

Of course, mixtures of functionalizing monomers can be also added so as to achieve functionalized copolymers in which the copolymer contains at least two different functionalizing monomers therein.

Reaction temperatures and pressures should be sufficient to melt the reactants and also sufficient to thermally decompose the free radical initiator to form the free radical. Reaction temperatures would depend on the base polymer being used and the free radical initiator being used. Typical reaction conditions can be obtained by using a screw type extruder to mix and melt the reactants and to heat the reactant mixture to the desired reaction temperature.

The temperatures useful in the reaction of the process of the present invention may vary between wide limits such as from +75° C. to 450° C., preferably from about 200° C. to about 300° C.

It is to be noted that since the side chain-containing backbone is already formed before this functionalization, the functional groups are attached directly to the block copolymer as opposed to already being on the chain and serving as a site for the side chains.

Definitions

As used herein "functionalized," "functionalizing" and "functionality" refer to the final treatment with the component containing at least one point of saturation such as maleic anhydride. "Functional group" and "functional to" refer to characteristics of the comonomer used in the second aspect of the first embodiment of this invention.

Utility

The block copolymers, as modified, can still be used for any purpose for which an unmodified material (base polymer) was formerly used. That is, they can be used for adhesives and sealants, or compounded and extruded and molded in any convenient manner.

EXAMPLE

Melt Phase Functionalization of Poly(α-olefin)-g-Polystyrene Polymers with Maleic Anhydride Maleic anhydride functionalization of two α-olefin backbone thermoplastic elastomers and one EPDM backbone thermoplastic elastomer was studied. A conventional thermoplastic elastomer prepared for comparison with the invention by sequentially polymerizing styrene, butadiene and then styrene followed by termination of the polymer chains, hydrogenation and hydrogenation catalyst removal was used as a comparison polymer. This polymer was used since such polymers are known to efficiently graft maleic anhydride in the melt in the presence of an organic peroxide. Characteristics of the polymers used are given in Table 1. Maleic Anhydride powder was dry blended with the polymer crumb, and 0.2 wt % 2,5-dimethyl-2,5-di(t-butylperoxy) hexane (sold under the tradename Lupersol 101 by Lucidol Pennwalt) was dispersed into the mixture as a 0.5 wt % solution in acetone. The mixtures were blended in a Custom Scientific Instruments melt mixer with a 5 cm³ capacity at 200–210° C. and 70–80 rpm for one minute. The products were then analyzed by FTIR to determine the weight % maleic anhydride grafted to the polymers. In addition, films were cast from toluene and stress/strain properties measured for comparison with the polymers before functionalizing.

Results of free radical functionalizing grafting are given in Table 2.

Sample KT-24H was prepared in accordance with the first embodiment, first aspect of this invention. Specifically, 1-hexene and 2 mole % allyl dimethyl-chlorosilane were copolymerized using a $Mg_6(OCH_2CH_3)_{10}TiCl_4$ (benzaldehyde)$_2$ catalyst with an ethyl aluminum dichloride cocatalyst to give an amorphous copolymer. Styrene was polymerized using a sec butyl lithium initiator and the resulting living polystyrene chains reacted with the copolymer to give saturated thermoplastic elastomer.

AZN-4A was prepared in accordance with the first embodiment, second aspect. Specifically, octene and 4-phenyl-1-butene were copolymerized using a $Mg_6$ $(OXCH_2CH_3)_{10}TiCl_4$(benzaldehyde)$_2$ catalyst with a triethylaluminum co-catalyst to give an amorphous polymer.

The resulting polymer was metallated with secondary butyl-lithium using N,N,N',N'-tetramethyl ethylenediamine as a promoter. Separately, styrene was introduced and a styrene polymer chain formed by anionic polymerization from the metallation site which acted in the manner of a conventional initiator.

ZNA-2G contains a backbone of a commercial EDPM sold under the tradename Nordell 1320 by DuPont. This material was then maleated and styrene grown from the metallation site as in AZN-4A above.

The composition labeled "comparison" was prepared as described hereinabove.

TABLE 1

Polymer Characteristics

| Polymer | Structure | Polystyrene Content (%)[c] | Polystyrene MW (g/mole)[f] | Number of Grafts/ 100K backbone Mw[i] |
|---|---|---|---|---|
| KT-24H | C$_6$-g-PS[a] | 31 | 6000[g] | 7.5 |
| AZN-4A | C$_8$-g-PS[b] | 22 | 6000[g] | 4.7 |
| ZNA-2G | EPDM-g-PS[c] | 43 | 9000[g] | 8.4 |
| Comparison | S-EB-S[d] | 30 | 7200/7700[h] | — |

[a]Poly(1-hexene)-g-polystyrene
[b]Poly(1-octene)-g-polystyrene
[c]EPDM-g-polystyrene
[d]Styrene-Hydrogenated Butadiene-Styrene triblock copolymer
[e]Determined by $^1$H NMR
[f]Determined by GPC
[g]Values reported are for each polystyrene graft
[h]Values reported are for first and second polystyrene block

[i]Calculated using the following equation: $Ng = \frac{100,000 \times wg}{Mg \times (1 - wg)}$ where
Ng = number of grafts per 100,000 g/mole of backbone
wg = weight fraction of graft (PS) in the graft copolymer
Mg = number average molecular weight of the graft (PS) in the graft copolymer polystyrene blocks per polymer chain than in a conventional triblock copolymer and thus a significant fraction of the polymer backbones still contain at least two grafts to form a mechanical network. Furthermore, when conventional thermoplastic elastomers are hydrogenated and functionalized, some aliphatic unsaturation generally remains and some of the aromatic unsaturation is destroyed. Here, the saturated elastomers have no or essentially no aliphatic unsaturation and all of the original aromatic unsaturation remains.

While this invention has been described in detail for the purpose of illustration, it is not to be construed as limited thereby but is intended to cover all changes and modifications within the spirit and scope thereof.

What is claimed is:

1. A process for producing a functionalized saturated thermoplastic elastomer comprising:
    (a) copolymerizing, under polymerization conditions to form a thermoplastic elastomer
        (i) a monomer system selected from (a) at least one C$_4$ to C$_{30}$ α-olefin and (b) ethylene with 20 to 40 mole percent of a higher α-olefin, and
        (ii) a comonomer of the general formula

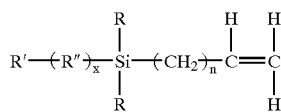

wherein R' is the remnant of an initiator, R" is a polymerized monoalkenyl arene unit, R is alkyl, n is an integer of from 0 to 16, and x is an integer sufficient to give said monomer a molecular weight within the range of 500–30,000; and
    (b) contacting said thermoplastic elastomer with a free radical initiator and a functionalizing monomer having at least one point of unsaturation.

2. A method according to claim 1 wherein said functionalizing monomer is selected from carboxylic acids and derivatives of carboxylic acids.

3. A method according to claim 1 wherein R' is the remnant of an unsaturated initiator, said comonomer thus being an α,ω-olefin.

TABLE 2

| | | | | Tensile Properties[c] Before Maleic Anhydride Grafting | | Tensile Properties[c] After Maleic Anhydride Grafting | |
|---|---|---|---|---|---|---|---|
| Sample | MA Added (wt %) | MA grafted[a] (wt %) | Graft Efficiency[b] (%) | Ultimate Strength (psi) | Ultimate Elongation (%) | Ultimate Strength (psi) | Ultimate Elongation (%) |
| KT-24H | 2.3 | 0.3 | 9.6 | 342 ± 35 | 239 ± 101 | 205 ± 46 | 126 ± 55 |
| AZN-4A | 2.3 | 0.32 | 14 | 830 ± 58 | 1166 ± 77 | 323 ± 4 | 204 ± 4 |
| ZNA-2G | 2.3 | 0.57 | 25 | 2574 ± 582 | 909 ± 66 | 1379 ± 106 | 428 ± 18 |
| Comparison | 3.1 | 0.97 | 42 | 6439 ± 231 | 681 ± 20 | 3097 ± 403 | 725 ± 29 |

[a]Determined by FTIR using an experimentally determined correlation between polystrene absorbance and carbonyl absorbance
[b]Calculated as follows:

$\% \text{ Graft efficiency} = \left(\frac{\% \text{ w MA Grafted}}{\% \text{ w MA Added}}\right) \times 100$

[c]Test performed on an INSTRON ® Model 4505 with a gauge length of 1 inch and a cross head speed of 1 inch/min. Values reported are the mean ± s.d. of at least three independent measurements on compression molded films.

As can be seen, the expected Beta-scission did not reduce the material to a useless condition. Perhaps less Beta-scission occurred than would have been predicted or perhaps this surprising result reflects the fact that there are more 4. A method according to claim 1 wherein
    (a) said comonomer is formed by reacting an alkyl alkali metal initiator with a monoalkenyl aromatic compound to give a living aromatic polymer chain said reacting being done in an α-olefin solvent selected from $C_6$ to $C_{30}$ olefins;

(b) thereafter reacting said living aromatic polymer chain with an alkenyl halosilane in the presence of a solvent which is an α-olefin selected from $C_4$ to $C_{30}$ α-olefin; and (c) thereafter reacting said comonomer with a monomer which is an α-olefin selected from $C_4$ to $C_{30}$ α-olefins to give a saturated thermoplastic elastomer, no other solvent being used in said method.

5. A method according to claim 4 wherein said α-olefin of (a), (b), and (c) is the same α-olefin.

6. A method according to claim 1 wherein said monomer system is a single monomer selected from octene and decene, said comonomer is the reaction product of a living polystyrene lithium chain and 6-hex-1-enyl dimethylchlorsilane, said copolymerizing is done in the presence of a transition metal catalyst.

7. A composition produced by the method of claim 6.

8. A composition produced by the method of claim 1.

9. A process for producing a functionalized saturated thermoplastic elastomer which comprises:

(a) copolymerizing:
 (i) a monomer system selected from at least one $C_4$ to $C_{30}$ α-olefin and ethylene plus 20 to 40 mole percent of a higher α-olefin with
 (ii) a comonomer formed by terminating a living polystyrene-lithium chain having a vinyl group at an end of said chain opposite the thus terminated lithium to produce a thermoplastic elastomer; and (b) contacting said thermoplastic elastomer with a functionalizing monomer having at least one point of unsaturation.

* * * * *